United States Patent [19]

Lin

[11] Patent Number: 4,937,817

[45] Date of Patent: Jun. 26, 1990

[54] PACKET SELECTION FOR PACKET DISTRIBUTION ARRANGEMENTS

[75] Inventor: Sheng L. Lin, Lisle, Ill.

[73] Assignee: American Telephone and Telegraph Company, New York, N.Y.

[21] Appl. No.: 291,487

[22] Filed: Dec. 29, 1988

[51] Int. Cl.$^5$ .................. H04J 3/24; H04Q 11/04
[52] U.S. Cl. ............................... 370/94.1; 370/60; 370/54
[58] Field of Search ............ 370/60, 94, 54, 58, 370/86, 85, 94.1, 58.1, 58.2, 85.12, 85.5; 340/825.05, 825.03, 826, 825.07, 825.52

[56] References Cited

U.S. PATENT DOCUMENTS

| | | | |
|---|---|---|---|
| 4,611,322 | 9/1986 | Larson et al. | 370/60 |
| 4,780,870 | 10/1988 | McHarg et al. | 370/60 |
| 4,799,215 | 1/1989 | Suzuki | 370/60 |

OTHER PUBLICATIONS

M. J. Karol et al., "*Input vs. Output Queueing on a Space-Division Packet Switch*", IEEE Global Telecommunications Conference, vol. 2, Dec. 1–4, 1986, pp. 0659–0665.

*Primary Examiner*—Douglas W. Olms
*Assistant Examiner*—Wellington Chin
*Attorney, Agent, or Firm*—Kenneth H. Samples

[57] ABSTRACT

A packet distribution network including a distributed arrangement for selecting packets based on the availability or unavailability of packet destinations is disclosed. A plurality of input units receive and store packets before distribution. Each input unit also receives a sequence of addresses representing packet destinations and a sequence of usage indicators each describing the availability or unavailability of an associated one of the destination addresses. The sequence of addresses and the associated usage indicators are provided to the input units such that the address of each packet destination is contemporaneously received by only one input unit. Each input unit selects a stored packet based on the received destination addresses and associated usage indicators and marks previously available destinations unavailable to other input units by modifying the usage indicator associated with a packet destination for which a packet is selected.

20 Claims, 3 Drawing Sheets

PACKET SELECTION FOR PACKET DISTRIBUTION ARRANGEMENTS

FIELD OF THE INVENTION

This invention relates to input arrangements for packet networks and particularly to distributed arrangements for selecting input packets for transmission to packet destinations based on the availability or unavailability of packet destinations for receiving packets.

BACKGROUND OF THE INVENTION

Packet switching arrangements have proven to be preferred switching networks for many types of digital communication. Data packets each comprising a data portion and a numerical designation of a packet destination are applied to the inputs of such a network and the network conveys each packet to the identified destination.

The traffic to be conveyed by packet networks tends to be bursty. During some periods of time many packets arrive for distribution and at other times few packets arrive. For economic reasons packet networks for switching bursty traffic are engineered to convey an average rate of traffic rather than the maximum rate. Such networks include packet buffering before, within or on the outputs of the actual switch network to help average the traffic rates.

Buffering packets at the input to the network is advantageous since it permits the use of simple network architectures such as the sort-then-expand (also called Batcher-Banyan) networks. Known input buffering arrangements select packets from a plurality of parallel input buffers based on first-in-first-out rules or based on packet priorities. This results in the "blind" transmission of packets where packets are sent to the network without certainty that the packet destination will be available when the packet arrives. Such blind transmission results in wasted network resources and low network throughput since packets which cannot be used by busy destinations are transmitted to the network.

Studies have shown that the maximum throughput of networks which practice the blind transmission of packets is only approximately 59 percent (see for example M. J. Karol et. al. "Input versus Output Queuing on a Space Division Packet Switch", IEEE Global Communication Conference, Houston, 1986, page 659). Attempts have been made to reduce the impact of this low throughput by providing arrangements for the retransmission of blocked packets. Although slight improvements can be obtained from such impact reduction attempts they result in increased packet delays and more complex network architectures.

Centralized arrangements have been constructed to select packets for distribution based on destination availability. With such arrangements a single unit accumulates all incoming packets, or information about the destinations of all incoming packets, and selects packets based on the destination information of all accumulated packets and the availability of packet destinations. Given the total number of packets to be considered and the number of selections to be made, such centralized arrangements are slow compared to the packet rates of commercial high capacity distribution systems and limit their packet distribution rate.

A need exists in the art for packet selection arrangements which provide the throughput advantages of packet selection based on destination availability while operating at high packet rates compatible with commercial high capacity packet systems.

SUMMARY OF THE INVENTION

The foregoing problems are solved and a technical advance is achieved in accordance with the principles of the invention in which packet destination availability is reviewed on a distributed basis as a part of packet selection by a packet selection arrangement including a plurality of input units, each storing a plurality of packets, and an arrangement for providing each input unit with a plurality of destination addresses each associated with a destination usage indicator. A selector in each input unit selects one of the plurality of packets stored thereby when a provided destination address matches the destination information of a stored packet and the destination usage indicator associated with the provided destination address indicates destination availability. Packet selection performed by a plurality of input units, each simultaneously performing a part of the overall packet selection function, provides high speed operation which is compatible with commercial high capacity packet systems.

The ability to select only one packet for each destination is improved in accordance with one aspect of the invention in which the address providing arrangement contemporaneously supplies a different one of the plurality of addresses, and its associated usage indicator, to each input unit. Single packet selection is also enhanced when the selection arrangement marks a matching destination address unavailable, by modifying its associated usage indicator to indicate unavailability, and subsequent input units are inhibited from selecting packets for packet destinations which are associated with usage indicators indicating unavailability. Also, one embodiment inhibits the selection of more than one packet by an input unit after that input unit selects a packet.

An illustrative embodiment achieves additional speed advantages by distributing the function of providing destination addresses to each input unit. Each input unit includes a counter which is incremented at regular intervals (called select intervals) to provide a series of destination addresses. To assure that each counter provides a different destination address from the others during each select interval, a different start value is initially established in each counter. This initial value is derived in the input units from a unique identity preassigned to each input unit. Advantageously, a random number is generated and sent to all input units and each initial counter value is derived by adding the random number to the preassigned identity.

The use of counters for providing a plurality of destination addresses permits the selection of the number of destination addresses provided to each input unit by the choice of the number of select interval signals generated. In one illustrative embodiment the addresses of all destinations are provided by generating a number of select interval signals equal to the number of destinations.

The usage indicators which define the availability or unavailability of packet destinations are conveyed from input means to input means in synchronism with the select intervals. In an illustrative embodiment, the packet destination addresses stored by the counters of the input means comprise an arithmetic series and the input units are connected in reverse order of this series for the transmission of usage indicators. As a result of this connection, an input means includes a unique destination address in its counter and receives the usage indicator associated with that unique address from the input means which included that address during the preceding select interval. This maintains the association of destination addresses and usage indicators.

The value of the usage indicator transmitted from one input unit to the next is controlled by the transmitting input unit. When an input unit does not select a packet during a select interval the usage indicator transmitted to the next input unit is the same as the usage indicator received by the transmitting input unit during the preceding select interval. In contrast, when an input unit selects a packet during a select interval the usage indicator transmitted to the next input means during the next select interval indicates destination address unavailability.

A part of packet selection is the comparison of the provided destination address from the counter with the destination information of a plurality of stored packets. To rapidly perform this comparison, each input unit includes a plurality of comparators, each of which compares the destination information of one stored packet with the provided destination address from the counter. This parallel comparison rapidly provides comparison results which are used in packet selection and also in the update of destination usage indicators.

Status indicators are provided to input units of the embodiments to indicate the availability of individual ones of the packet destinations to receive packets. An enabling arrangement in each input unit is controllable by the status indicators to enable the selection of packets for transmission from each input means to only one destination at a time.

DETAILED DESCRIPTION

Figure 1:
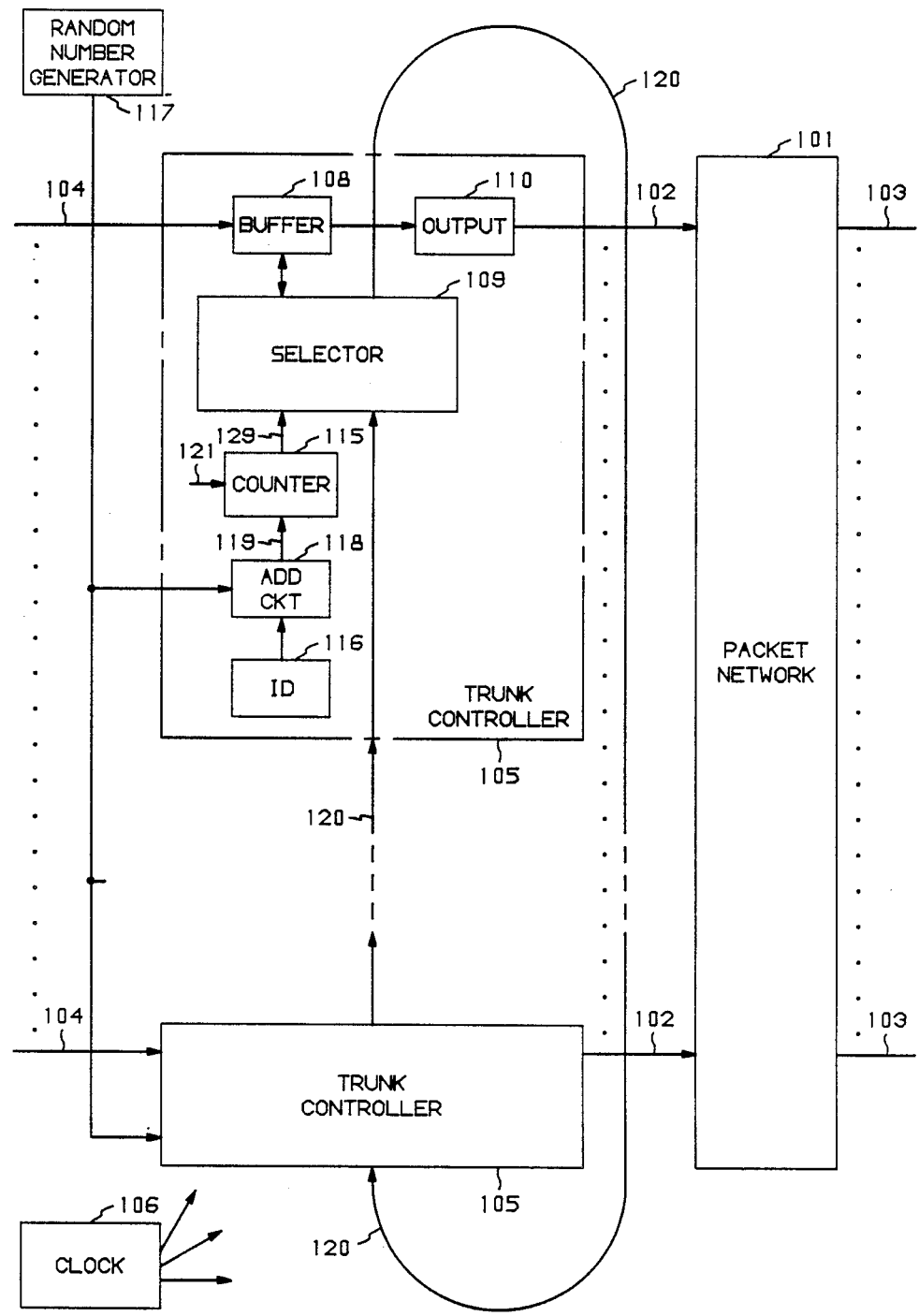
FIG. 1 is a block diagram of a system embodying the invention.

FIG. 1 is a block diagram of an embodiment of the present invention which includes a packet switching network 101 having 16 input ports 102 and 16 output ports 103. Network 101 is of the type described in Huang et. al. U.S. Pat. No. 4,516,238 and is non-blocking for sets of input packets which include only one packet for each network output port. Each input port 102 is connected to an incoming packet communication path 104 by a trunk controller 105 which receives and stores incoming packets from its associated communication path 104 in a buffer 108 and selects packets from buffer 108 for transmission to the connected input 102.

The trunk controllers 105 of FIG. 1 operate in synchronism to simultaneously transmit packets to network 101 at the beginning of a packet interval. Packet intervals are recurring periods of time which are defined by signals from a clock circuit 106 and are long enough to permit the transmission of an entire packet before the beginning of a subsequent packet interval.

Each trunk controller 105 comprises a buffer 108 for storing incoming packets, a selector 109 for selecting a buffered packet for transmission to the network 101 and an output register 110 for holding the selected packet prior to transmission. Trunk controllers cooperate in the selection of packets so that no two packets transmitted to network 101 during a packet interval are destined for the same network output port 103. Such pre-selection eliminates packet blocking in the network 101 and provides improved network throughput.

During each packet interval, the selector 109 of each trunk controller 105 is provided with the address of each output port 103 in association with a usage indication of the availability or unavailability, during the next packet interval, of the output port represented by the address. A particular address is presented to only one selector 109 at a time and when a selector selects a packet for a particular destination output the selector also marks the address representing that output port as unavailable to other trunk controllers 105. Before the next packet interval begins each trunk controller moves the packet selected thereby, if any, to output register 110 for transmission to network 101 during the next packet interval.

As a part of packet selection, selector 109 compares a provided destination address representing an output port 103 with the destination information of a predetermined number of packets from buffer 108 to determine if one of these packets is destined for the output port represented by the destination address. The choice of predetermined number of packets for comparison is made by the designer. A large predetermined number provides the highest throughput but also results in a complex and possibly slow selector 109. A smaller predetermined number yields a simpler selector 109 but may result in small throughput improvement. Table 1 represents simulated results for maximum throughput versus predetermined number for 128×128 switch. A throughput of 59 percent means that 59 percent of the transmitted packets are not blocked.

TABLE 1

| Predetermined Number | Maximum Throughput (%) |
|---|---|
| 1 | 9 |
| 2 | 71 |
| 4 | 81 |
| 8 | 88 |
| 16 | 93 |

In the present example the presented destination addresses are compared with the destination information of four buffered packets in selector 109; that is, the predetermined number equals four.

Each packet interval is divided into a number of select intervals (FIG. 3) equal to the number of packet destinations. The packet interval is divided into 16 select intervals since there are 16 output ports 103 in the present embodiment. During each select interval, selector 109 receives the destination address of one output port 103 and a usage signal on a conductor 120 defining the availability or unavailability of that output port during the next packet interval. At the end of a packet interval each selector will have checked for packets destined to all output ports 103.

Each trunk controller 105 includes a binary counter 115 which is used to provide a sequence of destination addresses for that trunk controller. Counter 115 comprises 4-bit positions which is sufficient to denote the addresses of all of the output ports 103. At the beginning of each packet interval each counter 115 is loaded with a binary value which is unique to the trunk controller 105 including it. This unique value is derived from a unique trunk controller identity which is preassigned to each trunk controller and stored in an identity register 116. The assigned identities of the trunk controllers 105 in FIG. 1 are "0000" for the top trunk controller, "0001" through "1110" in sequence for the intermediate 14 trunk controllers (not shown) and "1111" for the bottom trunk controller.

At the beginning of each packet interval, a random number from random number generator 117 is added (modulo 16) in an adder 118 to each trunk controller identity and the result is transmitted to counter 115 via a conductor 119. The addition of the random number to the trunk controller identity results in counters 115 storing the values "0000" through "1111" in sequence but the actual value in any counter 115 is determined by the random number. This improves the fairness of packet selection randomly by changing the destination address provided to each selector 109 at the beginning of each packet interval. The value stored by comparator 115 represents the destination address of an output port 103 and is applied as an input to selector 109.

Each selector 109 also receives a usage signal on conductor 120 defining whether the output port represented by the address in counter 115 is available or unavailable during the next packet interval. The usage signal for selector 109 is generated by the selector of the trunk controller having the next higher trunk controller identity. It should be noted that the usage signal for selector 109 of the bottom trunk controller (identity = "1111") is generated by the selector of the top most trunk controller (identity = "0000"). The usage signals are transmitted from selector to selector in a daisy chain fashion via the communication path 120.

Figure 3:
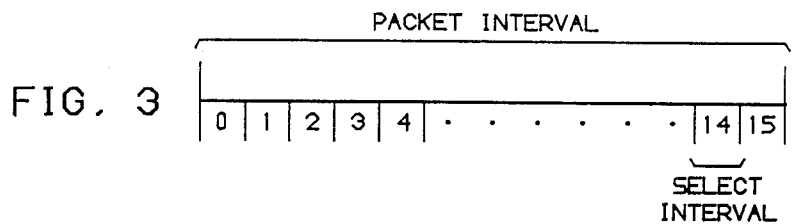
FIG. 3 and 4 show the coordination of timing intervals employed in the embodiments.

Each packet interval in the present example is divided into 16 select intervals numbered 0 through 15 as shown in FIG. 3. During the first select interval all selectors 109 receive a unique destination address from the counter 115 associated therewith and a usage signal on communication path 120 defining that the destination is available (no destinations have yet been selected). The destination address in counter 115 is compared with the destination address information of up to four packets from buffer 108. When no match is found the selector 109 takes no action, however, when a match is found selector 109 moves the matching packet from buffer 108 to output register 110, generates an inhibit signal, internal to the generating selector 109, and generates a usage signal defining the unavailability of the selected destination. The inhibit signal is generated by the ones of selectors 109 which detect a match and is used to inhibit further packet selection by the generating selector until the next packet interval.

Clock circuit 106 begins the second select interval by generating a counter increment signal which is sent to each counter 115 via a conductor 121. Counter 115 responds to the increment signal by adding 1 (modulo 16) to the counter value to present the next higher designation to each selector 109. At this time each selector 109 also transmits a new usage signal to the next selector in the sequence. The new usage signal indicates availability when the generating selector did not select a packet during the preceding (first) select interval and indicates unavailability when the generating selected a packet during the preceding select interval.

During the second and subsequent select intervals a selector 109 receiving a usage signal defining unavailability does not select a packet even if the destination information one of the packets stored thereby matches the counter value. Any selector receiving a usage signal defining availability selects a packet (if a match exists) in the manner described above.

Each counter 115 is again incremented at the beginning at the third select interval and a new usage signal is transmitted from one selector to the next in the sequence. The new usage signal indicates destination availability when no prior selector (including the selector generating the signal) has selected the destination represented by the counter 115 of the receiving selector 109. Similarly, the new usage signal indicates destination unavailability when any prior selector (including the selector generating the signal) has selected the destination represented in the counter 115 of the receiving selector 109.

The select intervals continue as described until the end of the 16th interval when all destination addresses and their associated usage signals have been presented to each selector 109. At this time, output registers 110 of trunk controllers 105 contain all of the packets selected during the packet interval. At the end of the 16th select interval a new selection phase begins by resetting all usage signals to indicate availability and resetting the inhibit signals, internal to the selectors 109, so that all selectors can again select the packets. The above cycle of select intervals repeats during the next packet interval and packets selected during the preceding packet interval are transmitted to network 101.

Figure 4:
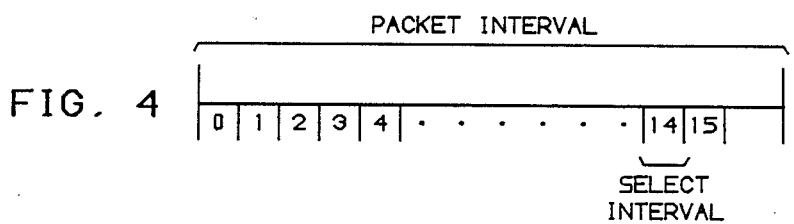

The packet interval shown in FIG. 3 is divided into 16 equal select intervals 0 through 15 which occupy the entire packet interval. FIG. 4 shows an alternate division of the packet interval in which the 16th select interval ends prior to the end of the packet interval. This leaves time, after packet selection, to move packets to the output register 110 and to reset the inhibit and usage signals in each selector.

Figure 2:
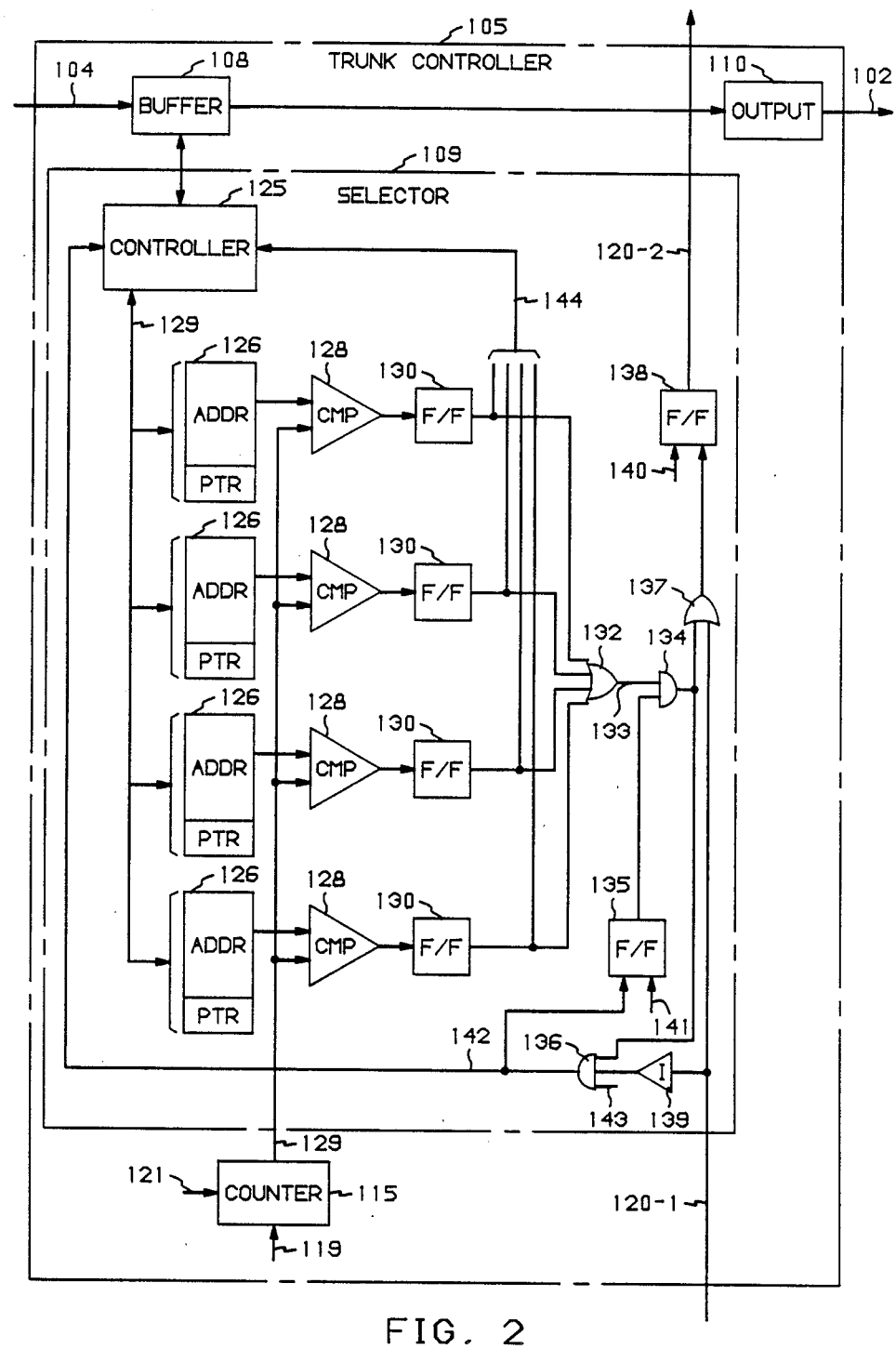
FIG. 2 is a diagram of a trunk controller shown in FIG. 1.

FIG. 2 represents the structure of all trunk controllers 105 and shows the internal structure of selector 109. In FIG. 2 the input portion of usage signal communication path 120 is labeled 120-1 and the output portion of this communication path is labeled 120-2.

Selector 109 (FIG. 2) includes four registers 126 and a controller 125 which reads representations of stored packets from buffer 108 and places one in each register 126. Each register 126 includes an address portion storing the destination address of a packet in buffer 108 and a pointer defining the location in buffer 108 which stores the packet having the destination address stored in the address portion. The address portion of each register 126 is applied as one input to an associated one of four comparators 128. Each comparator also receives the current numerical value of counter 115 via a path 129. Each comparator 128 sets an associated one of four flip-flops 130 to the "1" state when the value of counter 115 matches the address stored in the associated register 126. The outputs of flip-flops 130 are combined in an OR gate 132 so that the output of OR gate 132 will be a "1" when any of the address portions of register 126 match the value in counter 115.

The output of OR gate 132 is applied via a conductor 133 as an input to an AND gate 134, the other input of which is connected to an inhibit flip-flop 135. Inhibit flip-flop 135 is set to apply a "1" to AND gate 134 at the beginning of each packet interval and upon being reset, generates a "0" inhibit signal to inhibit the selection of a second packet during one packet interval. The output of AND gate 134 is the same as the output of OR gate 132 while flip-flop 135 is set to "1" and is "0" when flip-flop 135 is reset to "0". The output of AND gate 134 is applied and an input to an AND gate 136 and OR gate 137.

OR gate 137 controls the destination usage signal that will be applied to the next selector during the immediately succeeding select interval. OR gate 137 receives as inputs the output of AND gate 134 and the usage signal from the preceding selector via conductor 120-1. The destination usage signal output of OR gate 137 is a "1" when a prior selector has selected the destination address now represented in counter 115 or when one of the addresses in registers 126 match the value of counter 115. The output of OR gate 137 is applied to the data input of a flip-flop 138. At the beginning of each select interval flip-flop 138 is toggled by a signal from clock circuit 106 on conductor 140 to store and transmit the usage signal at its data input to the next selector 109 via usage signal output path 120-2. It should be mentioned that flip-flop 138 is cleared to "0" indicating idle at the beginning of each packet interval.

The usage signal from the previous selector 109 on conductor 120-1 is also applied via an inverter 139 to an input of AND gate 136. A strobe signal from clock 106 is applied to the remaining input 143 of AND gate 136, at the end of each select interval. In response to this strobe signal, the output of AND gate 136 is a "1" only if the usage signal on conductor 120-1 from the previous selector 109 indicats availability and the output of AND gate 134 is a "1" indicating a match of packet destinations. This combination of inputs occurs only when the destination represented by counter 115 is available and matches one of the addresses stored in registers 126. The "1" output from AND gate 136 indicates a packet selection and is applied via a conductor 142 to the reset input of flip-flop 135 and to controller 125. The "1" signal on conductor 142 resets flip-flop 135 to the zero state inhibiting the further selection of packets by the selector 109. All flip-flops 135 are set to the "1" state by a signal on conductor 141 from clock 106 at the beginning of each packet interval.

The output of AND gate 136 is also sent via conductor 142 to notify controller 125 that a matching, available packet has been found. Controller 125 responds to a "1" on conductor 142 by inhibiting further comparison by comparators 128 and interrogating each of the flip-flops 130 via a communication path 144. A flip-flop 130 in the "1" state means that the address in the associated one of registers 126 matches the value of counter 115. Upon detecting a flip-flop 130 in the "1" state controller 125 reads the pointer portion of the associated register 126 via a communication path 145 and uses that pointer to move a packet from buffer 108 to output register 110. After moving the packet to output register 110, controller 125 inserts a new address and packet pointer, representing another packet, into the register 126 which just matched.

Advantageously, controller 125 places packet representations in registers 126 such that no other register 126 in the same selector 109 represents a packet for the same destination. This improves packet throughput. Controller 125 could, alternatively, place packet representations in registers 126 in the order in which packets are received by buffer 108. Since this permits packets having same destinations to be simultaneously represented in registers 126, controller 125 includes the ability to select one matching packet when more than one matching packet is detected.

Figure 5:
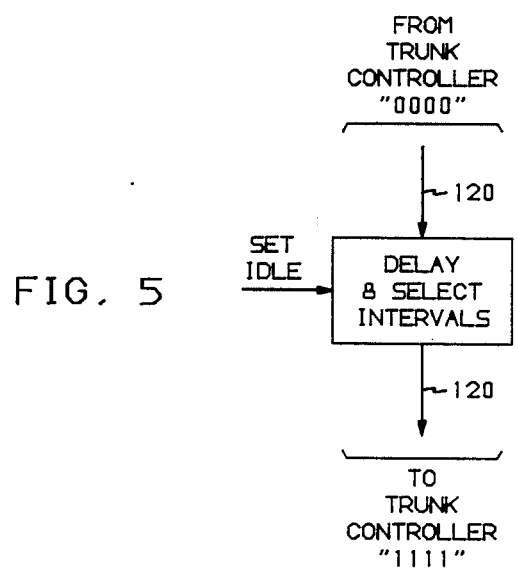
FIG. 5 is a block diagram of a delay unit used in an embodiment.

The network in the preceding example had the same number of trunk controllers and packet destination output ports. The present invention also improves packet throughput when the number of inputs and outputs are not equal. For example, when the number of inputs is 8 and the number of outputs is 16 the selectors 109 operate as a above described for packet selection. However, a delay unit (FIG. 5) equivalent to eight select intervals must be inserted into the usage signal path 120 to maintain the association of counter 115 values and the usage signals. In the present example, the delay unit of FIG. 5 is connected serially into conductor 120 between the top most trunk controller 105 and the bottom most trunk controller 105. The delay unit is constructed from eight flip-flops which are controlled in the manner of the flip-flops 138 in each selector 109.

The preceding description relates to the transmission of packets through a packet switching network. The principles in the invention apply equally well to the distribution of any data messages which include a destination address to any addressed utilization device or resource. Additionally, the term "destination usage signal" (indicator) is used to denote any signals which identify the availability or unavailability of packet destinations. Such destination usage signals may be any busy/idle type status indicators which describe the availability of utilization devices.

I claim:

1. An arrangement for selecting packets for conveyance to a plurality of packet destinations, comprising:
   a plurality of input means, each of said input means for storing a plurality of packets comprising destination information identifying one of a plurality of packet destinations;
   means for providing each input means with a plurality of destination addresses each destination address identifying one of said destinations and having an associated destination usage indicator indicating the availability status of the destination identified by the associated destination address;
   means in each of said input means for selecting one of said stored packets when one of said provided destination addresses matches the destination information of one of said packets stored thereby and the destination usage indicator associated with the matched destination address indicates that the destination represented by the matched destination address is available; and
   means for conveying packets selected by said selecting means from said input means.

2. The arrangement of claim 1 wherein the destination addresses of said plurality of destination addresses are provided to each input means one at a time and said providing means comprises means for contemporaneously supplying a different one of said plurality of destination addresses and the destination usage indicator associated therewith to each input means.

3. The arrangement of claim 1 comprising means responsive to said selecting means for modifying the destination usage indicator associated with said matched destination address to indicate that the destination identified by the matched destination address is unavailable.

4. The arrangement of claim 1 wherein each of said means for selecting comprises means for inhibiting the selection of one of said stored packets when the destination usage indicator associated with a provided destination address indicates unavailability of the destination identified by the associated destination address.

5. The arrangement of claim 1 wherein said means for providing comprises:
   a count register in each of said input means;
   means connected to said count registers for establishing a different destination address in each of said count registers;
   means for generating a plurality of select interval signals; and
   means responsive to each of said select interval signals for incrementing the destination address in each of said count registers by the same amount.

6. The arrangement of claim 5 wherein each of said input means is assigned a unique numerical identifier and said means for establishing comprises means in each of said input means for loading a destination address derived from the unique numerical value assigned thereto into the count register comprised thereby.

7. The arrangement of claim 6 comprising a means for generating a random number and each of said means for loading comprises means for loading a destination address derived by adding said random number to said unique numerical identifier.

8. The arrangement of claim 5 wherein said means for generating comprises means for generating a number of said select interval signals equal to the number of said packet destinations.

9. The arrangement of claim 5 comprising means for connecting said input means into a closed loop such that each input means is connected to receive destination usage indicators from one other of said input means and each of said input means comprises means for transmitting destination usage indicators to the input means connected by said connecting means to receive destination usage indicators therefrom.

10. The arrangement of claim 9 wherein said means for transmitting comprises means for receiving a destination usage indicator from said connecting means and means responsive to one of said select interval signals for transmitting the received destination usage indicator on said connecting means.

11. The arrangement of claim 10 wherein each of said means for transmitting comprises means for receiving from said connecting means a destination usage indicator indicating destination availability; and
   means responsive to said means for selecting and to one of said select interval signals for transmitting on said connecting means a destination usage indicator identifying one of said destinations as unavailable.

12. An arrangement for selectively reading a packet from storage, comprising:
   storage means for storing a plurality of a packets each comprising destination information identifying one of said packet destinations;
   register means for registering an address representing one of said packet destinations;
   means for periodically changing the address registered by said register means;
   selection means for selecting one of said stored packets having destination information identifying the same one of said packet destinations as is represented by the address registered by said register means; and
   means for reading said selected packet from said storage means.

13. The arrangement of claim 12 comprising:
   means for receiving destination usage signals indicating the unavailability of the destination represented by the address registered in said register means; and
   means responsive to said destination usage signals indicating unavailability for inhibiting said selection means from selecting one of said stored packets.

14. The arrangement of claim 12 comprising:
   means responsive to the selection of a stored packet by said selecting means for generating a prior selection signal; and
   means responsive to said prior selection signal for inhibiting said selection means from selecting additional ones of said stored packets.

15. The arrangement of claim 14 comprising means for periodically terminating the generation of said prior selection signal.

16. The arrangement of claim 12 wherein said selection means comprises:
   comparing means for generating a match signal when the address registered by said register means is the same as the destination information of one of said plurality of packets; and
   means responsive to said match signal for moving one of said stored packets to an output means.

17. The arrangement of claim 16 comprising means for receiving a destination usage signal indicating the availability of the destination represented by the address registered by said register means; and
   means responsive to said match signal for generating a destination usage signal indicating the unavailability of one of said packet destinations.

18. The arrangement of claim 16 wherein said comparing means comprises a plurality of comparators each for comparing the destination information of a different one of said stored packets with the address registered by said register means.

19. An arrangement for selectively transmitting packets to a plurality of packet destinations comprising:
   a plurality of input means, each input means for storing a plurality of packets each packet comprising destination information identifying one of said plurality of packet destinations;
   means for providing individual status indicators to said input means, each of said status indicators indicating the availability of an individual one of said destinations to receive a packet;
   means in each of said input means, controllable by said status indicators for enabling the selection of packets for transmission from each of said input means to only individual ones of said destinations at a time; and
   means responsive to said enabling means for transmitting packets to said packet destinations.

20. An arrangement for selectively reading packets from storage, comprising:
   a plurality of inut means, each input means for storing a plurality of packets each packet comprising destination information;
   means distributed in each of said input means and responsive to a plurality of destination addresses, each with an associated usage indicator, for selecting one of said stored packets when one of said destination addresses matches the destination information of one of said packets stored thereby and the destination usage indicator associated with the matched destination address indicates that the destination represented by the matched destination address is available; and
   means responsive to said selecting means for reading packets selected by said selecting means from said input means.

* * * * *